(12) United States Patent
Smith et al.

(10) Patent No.: US 10,390,495 B2
(45) Date of Patent: Aug. 27, 2019

(54) LIGHT TROLLEY SYSTEM

(71) Applicant: Bright Agrotech, Inc., Laramie, WY (US)

(72) Inventors: Damon Henry Smith, Laramie, WY (US); Nathaniel R. Storey, Laramie, WY (US); Taylor Brooke Wollert, Lingle, WY (US)

(73) Assignee: MINN, LLC, South San Francisco, CA (US)

( * ) Notice: Subject to any disclaimer, the term of this patent is extended or adjusted under 35 U.S.C. 154(b) by 278 days.

(21) Appl. No.: 15/487,451

(22) Filed: Apr. 14, 2017

(65) Prior Publication Data

US 2017/0303478 A1   Oct. 26, 2017

Related U.S. Application Data

(60) Provisional application No. 62/324,912, filed on Apr. 20, 2016.

(51) Int. Cl.
| | |
|---|---|
| *A01G 9/20* | (2006.01) |
| *F21V 29/58* | (2015.01) |
| *F21S 4/28* | (2016.01) |
| *A01G 22/00* | (2018.01) |
| *A01G 7/04* | (2006.01) |
| *F21V 21/14* | (2006.01) |
| *A01G 9/26* | (2006.01) |

(52) U.S. Cl.
CPC .............. *A01G 9/20* (2013.01); *A01G 7/045* (2013.01); *A01G 9/26* (2013.01); *A01G 22/00* (2018.02); *F21S 4/28* (2016.01); *F21V 21/14* (2013.01); *F21V 29/58* (2015.01); *Y02A 40/274* (2018.01)

(58) Field of Classification Search
CPC .......... A01G 9/20; A01G 22/00; A01G 7/045; A01G 9/26; F21V 29/58; F21V 21/14; F21S 4/28; Y02A 40/274
USPC ........................................................ 362/368
See application file for complete search history.

(56) References Cited

U.S. PATENT DOCUMENTS

| | | |
|---|---|---|
| 2014/0000162 A1 | 1/2014 | Blank |
| 2014/0020292 A1 | 1/2014 | McNamara et al. |
| 2014/0225003 A1 | 8/2014 | Koo et al. |
| 2014/0369061 A1 | 12/2014 | Kim |
| 2017/0051901 A1* | 2/2017 | Ogata .................... F21V 21/22 |

FOREIGN PATENT DOCUMENTS

EP          2090824          8/2009

* cited by examiner

*Primary Examiner* — Andrew J Coughlin
*Assistant Examiner* — Jessica M Apenteng
(74) *Attorney, Agent, or Firm* — Patent Law Office of David G. Beck

(57) ABSTRACT

A light trolley system for vertical-plane growing that maximizes the coverage area, quality of light, and useable growing area is provided. The light trolley system comprises a support structure and a first C rail secured to the support structure. The first C rail has a first end and a second end. A first brace is mounted to the first C rail and a first light trolley secured to the first brace. The first light trolley has at least one bar light mounted within a light manifold. The first brace supports and stabilizes the first light trolley. The combined first brace and first light trolley is moveable along the first C rail between the first end and the second end of the first C rail allowing the first light trolley to be moved to various locations increasing labor efficiency in the growing area.

13 Claims, 4 Drawing Sheets

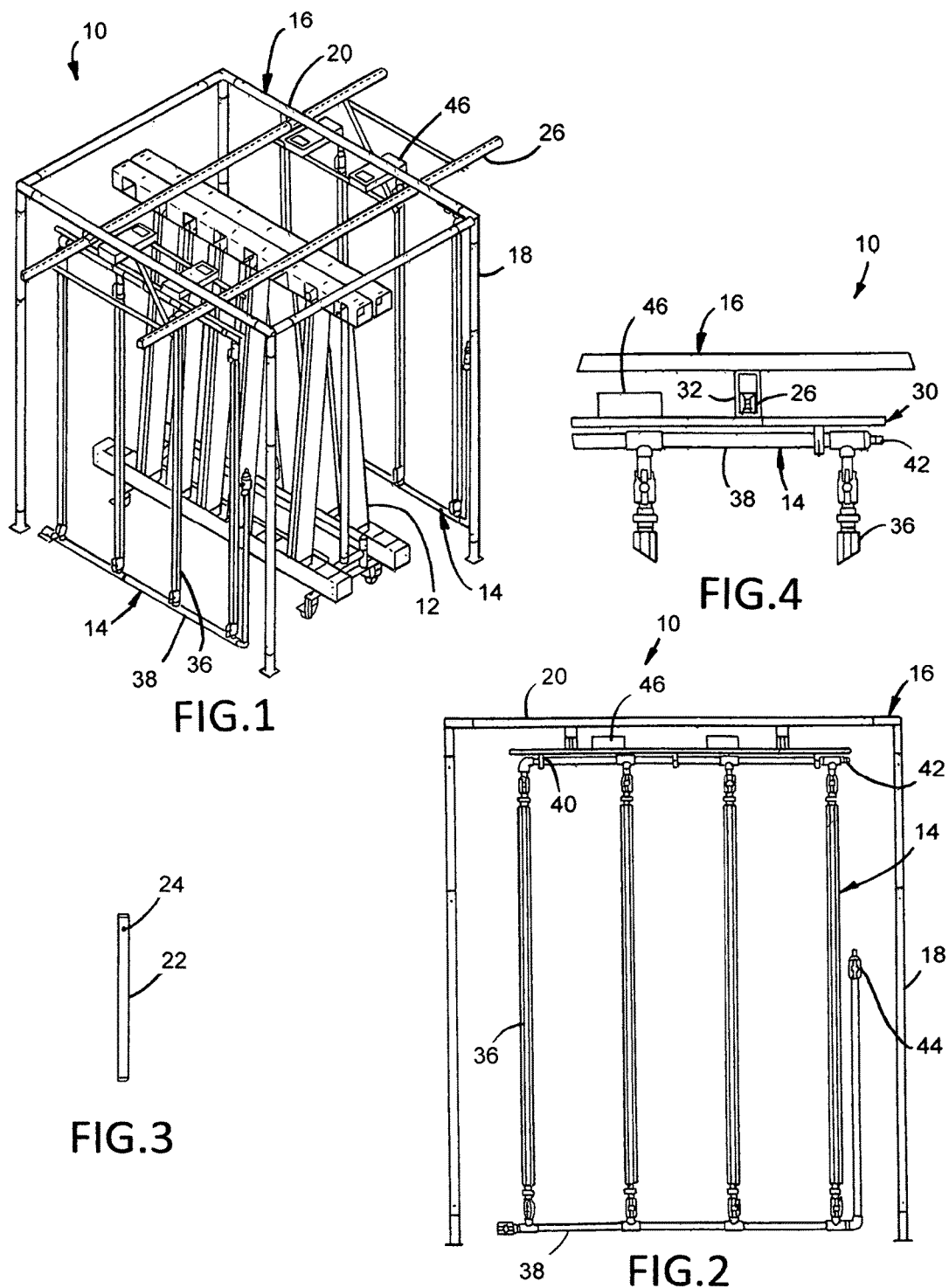

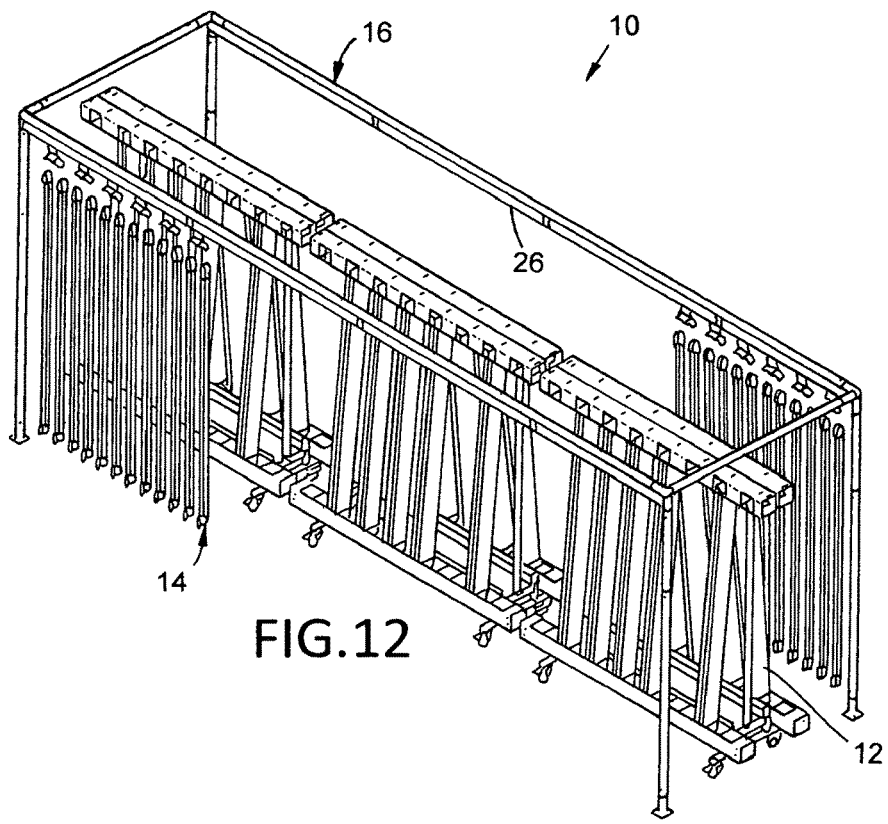
FIG.12
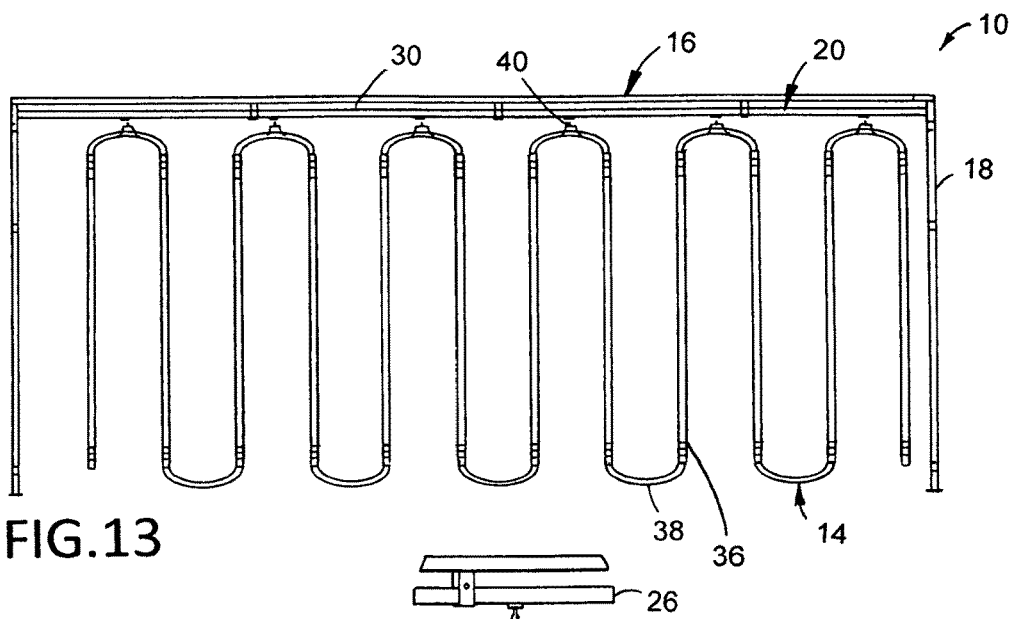
FIG.13
FIG.14

LIGHT TROLLEY SYSTEM

The present application claims benefit of priority from U.S. provisional patent application Ser. No. 62/324,912, filed Apr. 20, 2016, entitled "Light Fixture System".

BACKGROUND OF THE INVENTION

1. Field of the Invention

This invention relates generally to a light trolley system and, more particularly, the invention relates to a light trolley system for vertical-plane growing that maximizes the coverage and quality of the light and enables the space to be useable.

2. Description of the Prior Art

High intensity indoor growing environments have unique lighting needs that are not always met by traditional lighting form-factors. Developing these form factors requires not only new lighting designs, but new designs for mounting lighting and utilizing these lights in a way that maximizes light use efficiencies within the farm.

Vertical-plane growing is no exception, and requires light fixture systems that both hang the lights in a way that maximizes the coverage and quality of the light, but also enables the space to be useable, i.e., allows workers to move lights out of the way when necessary to work on the plants.

SUMMARY

The present invention is a light trolley system for vertical-plane growing that maximizes the coverage area, quality of light, and useable growing area. The light trolley system comprises a support structure and first C rail secured to the support structure. The first C rail has a first end and a second end. A first brace is mounted to the first C rail and a first light trolley secured to the first brace. The first light trolley has at least one bar light mounted within a light manifold. The first brace supports and stabilizes the first light trolley. The combined first brace and first light trolley is moveable along the first C rail between the first end and the second end of the first C rail allowing the first light trolley to be moved to various locations increasing labor efficiency in the growing area.

In addition, the present invention includes a method for vertical-plane growing that maximizes the coverage area, quality of light, and useable growing area. The method system comprises providing a support structure, securing a pair of spaced, parallel C rails to the support structure with each of the C rails having a first end and a second end, mounting a first brace to the C rails, securing a first light trolley to the first brace with the first light trolley having at least one bar light mounted within a light manifold, supporting and stabilizing the first light trolley with the first brace, moving the combined first brace and first light trolley along the C rails, and allowing the first light trolley to be moved to various locations increasing labor efficiency in the growing area.

The present invention further includes a light trolley system for vertical-plane growing that maximizes the coverage area, quality of light, and useable growing area. The light trolley system comprises a support structure and a pair of spaced, parallel C rails secured to the support structure. Each of the C rails has a first end and a second end. A first light trolley is mounted to the C rails with the first light trolley having at least one bar light mounted within a light manifold and the first light trolley moveable along the C rails between the first ends and the second ends of the C rails. A second light trolley is mounted to the C rails with the second light trolley having at least one bar light mounted within a light manifold and the second light trolley moveable along the C rails between the first ends and the second ends of the C rails. At least one stopper is positioned on each of the C rails between the first light trolley and the second light trolley on each of the C rails to limit a travel extent of the first light trolley and the second light trolley and to prevent the first light trolley from contacting the second light trolley. Wherein the first light trolley and the second light trolley are moveable along the C rails allowing the first light trolley and the second light trolley to be moved to various locations increasing labor efficiency in the growing area.

BRIEF DESCRIPTION OF THE DRAWINGS

FIG. 1 is a perspective view illustrating a light trolley system, constructed in accordance with the present invention;

FIG. 2 is an elevational side view illustrating the light trolley system, constructed in accordance with the present invention;

FIG. 3 is an elevational side view illustrating a single support section of a support structure of the light trolley system, constructed in accordance with the present invention;

FIG. 4 is a perspective view illustrating a connection between a brace and the support structure of the light trolley system, constructed in accordance with the present invention;

FIG. 12 is a perspective view illustrating another embodiment of the light trolley system, constructed in accordance with the present invention, with the light trolleys moving parallel and horizontally with the growing plane;

FIG. 13 is an elevational side view illustrating the light trolley system of FIG. 12, constructed in accordance with the present invention; and FIG. 14 is a close up elevational side view illustrating the connection between the brace and the light trolley of the light trolley system of FIG. 12, constructed in accordance with the present invention.

DETAILED DESCRIPTION OF THE PREFERRED EMBODIMENTS

Figure 5:
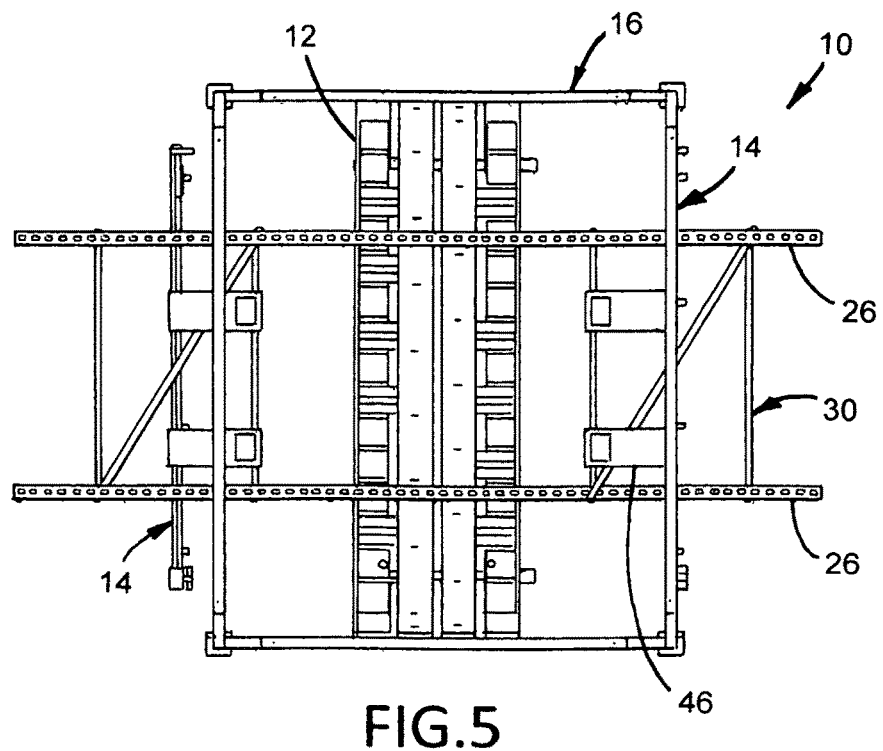
FIG. 5 is a top plan view illustrating the light trolley system, constructed in accordance with the present invention.
Figure 6:
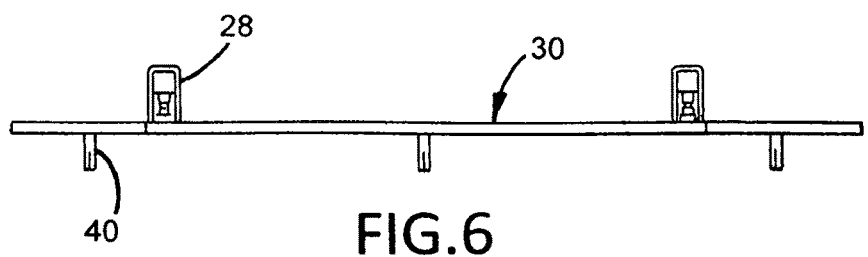
FIG. 6 is an elevational side view illustrating a hanging adjustable pipe clamp connected to the brace of the light trolley system, constructed in accordance with the present invention.
Figure 7:
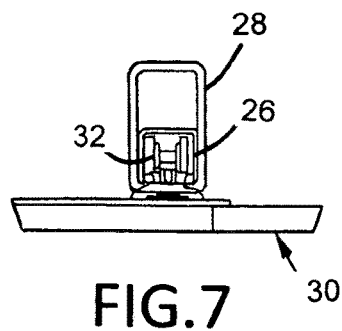
FIG. 7 is a close up elevational side view illustrating the hanging adjustable pipe clamp connected to the brace of the light trolley system of FIG. 6, constructed in accordance with the present invention.
Figures 8, 9:
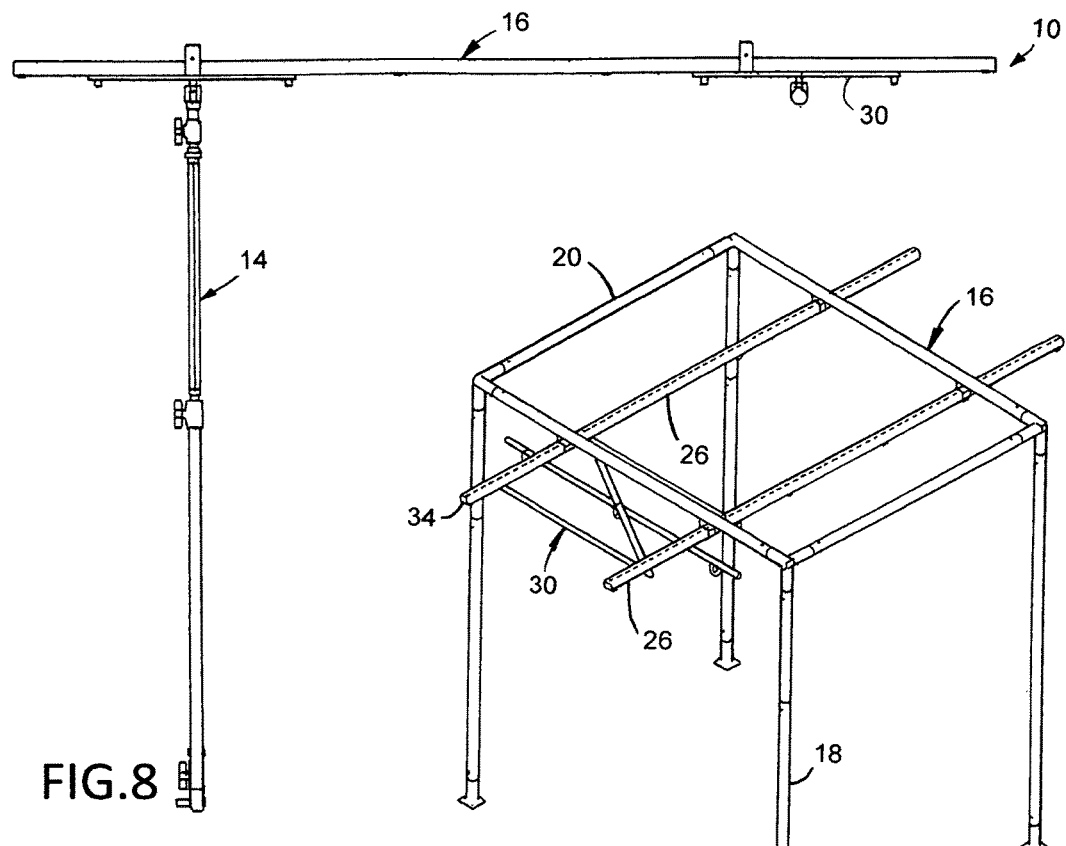
FIG. 8 is an elevational side view illustrating the support structure, the brace, and the light trolley of the light trolley system, constructed in accordance with the present invention.
FIG. 9 is a perspective view illustrating the brace and a pair of C rails mounted to the support structure of the light trolley system, constructed in accordance with the present invention.
Figures 10, 11:
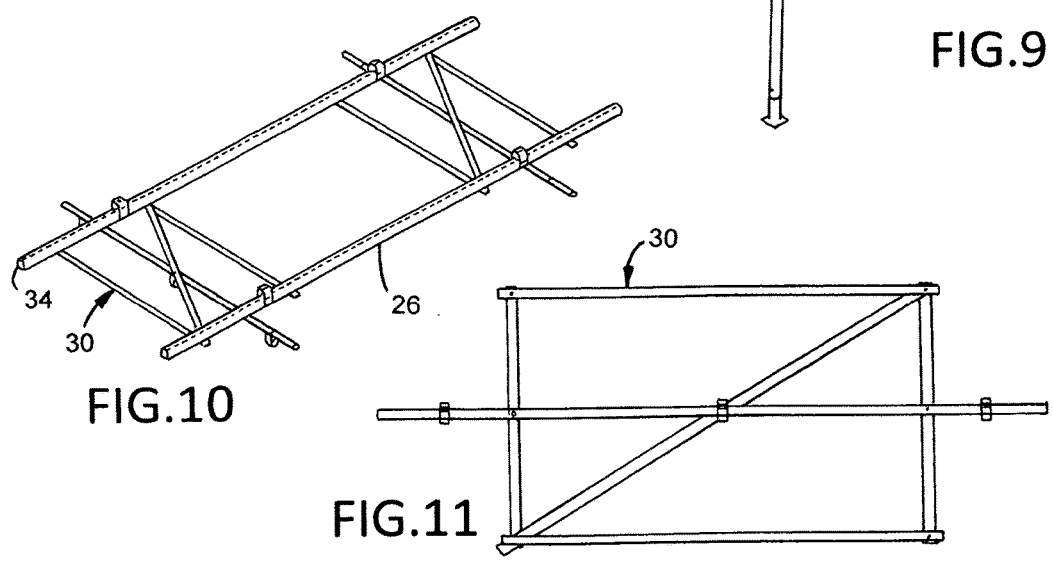
FIG. 10 is a perspective view illustrating the brace mounted to the C rails of the light trolley system, constructed in accordance with the present invention.
FIG. 11 is a top plan view illustrating the brace of the light trolley system, constructed in accordance with the present invention.

As illustrated in FIGS. 1-14, the present invention is a light trolley system, indicated generally at 10, for vertical-plane growing in growing towers 12 and the like that maximizes the coverage and quality of the light and enables the space to be useable. The purpose of the light trolley system 10 of the present invention is to allow hanging of bar-type horticultural lights or light trolleys 14 allowing the lights to be water cooled and allowing the lights to be moved out of the way using the light trolley system 10 so that labor can be more efficiently used in the growing area.

The light trolley system 10 of the present invention includes a modular support structure 16 having a plurality of vertical support members 18 and a plurality of horizontal support members 20. Preferably, the modular support structure 16 includes four spaced vertical support members 18 with a horizontal support members 20 connected to the end and extending between adjacent vertical support members 18. Each of the vertical support members 18 and the horizontal support members 20 can include a plurality of support sections 22, either separate or telescoping, that can be added or subtracted from the modular support structure 16 thereby adjusting the vertical and/or horizontal size of the modular support structure 16. A ball detent 24 or other releasable locking means, such as friction, latches, etc., can releasably secure the support sections 22 together that form the vertical support members 18 and the horizontal support members 20 of the support structure 16.

In addition, the light trolley system 10 of the present invention includes a pair of C rails 26 suspended and secured between two opposing horizontal support members 20 of the support structure 16. The C rails 26 are preferably surrounded by a C rail bracket 28 to support the C rails from the support structure 16 and to protect the C rails 26 from dirt, debris, moisture, damage, etc.

The light trolley system 10 of the present invention further includes at least one brace 30 mounted to the C rails 26 and includes a connection mechanism 32 allowing the brace 30 to travel along the length of the C rails 26. The brace 30 supports and stabilizes the light trolley 14 and the brace 30 is preferably formed in a square containing structural triangles to provide added rigidity between the light trolleys 14 and while moving the light trolleys 14 along the C rails 26. The square of the brace 30 may be composed of separate parts connected to form one part or as one solid part. It should be noted that the brace 30 is desired, but optional, in that the light trolleys 14 can be connected directly to the C rails 26 without the use of the brace 30.

The connection mechanism 32 of the light trolley system 10 of the present invention can have bearings, wheels, or other features allowing smooth and easy travel of the light trolleys 14 along the C rails 26. Basically, as mentioned, the brace 30 is designed and constructed to stabilize the light trolleys 14 and inhibit the light trolleys 14 from locking up in the C rails 26 when a user attempts to move the light trolleys 14 along the C rails 26 by grabbing or otherwise manipulating the light trolleys 14 from a far edge of the light trolleys 14.

To ensure the braces 30 and the light trolleys 14 of the light trolley system 10 of the present invention are not pushed beyond the C rail 26 limits, at least one stopper 34 are placed at measured locations along each C rail 26. The stoppers 34 include, but are not limited to, a small bump in the rails or a magnet allowing the user to position the braces 30 and the light trolley 14 into operating position for optimal lighting of the grow towers 12, as will be described further below.

As mentioned above, the light trolley system 10 of the present invention preferably includes the light trolley 14 mounted directly or indirectly to each brace 30. The light trolley 14 includes a plurality of bar lights 36 mounted within a light manifold 38. Hanging adjustable pipe clamps 40 connect the light manifold 38 of the light trolley 14 to each brace 30. The light manifold 38 is preferably constructed of rigid tubing having an intake port 42 and output port 44. Each of the intake port 42 and the output port 44 have a flexible tubing connector for joining the rigid pipes of the light manifold 38 of the light trolley 14 to flexible tubing thereby allowing light trolleys 14 to maintain mobility. The flexible tubing allows water to be introduced into light manifold 38 of the light trolley 14 to cool the bar lights 36 and allows mobility of the suspended bar lights 36 and the entire light trolley 14. Thus, the hanging adjustable pipe clamps 40 allow the water cooled bar lights 36 to be hung by their irrigation 38, if desired, as will be described below.

For lights that are not water cooled, the brace 30 of the light trolley system 10 of the present invention can be connected to a platform which supports the light bars 36. Power supplies 46 used to operate the lights may also be mounted to the brace 30 or mounted directly to the modular support structure 16.

Using the light trolley system 10 of the present invention, the bar lights 36 can hang from their frame/body, i.e., the light manifold 38, or by a support platform, or by irrigation connecting the bar lights 36 together in water-cooled systems. In addition, by using light trolleys 14, workers can walk into the growing environment, and push the lighting trolleys 14, out of the way in whichever direction they choose. This allows the growing space to stay open and easy to work in, and allows for tighter aisle widths in order to pack more production into a smaller space without sacrificing access to the racks for workers. The light trolley system 10 is designed to allow coolant to continue flowing through the bar lights regardless of their location relative to the growing racks or towers 12.

Movement of light trolleys 14 of the light trolley system 10 of the present invention is initiated by pushing directly on the light trolleys 14, moving the light trolleys 14 by a handle attached to the light trolleys 14, or by a motorized or manual pulley system. The light trolley system 10 of the present invention allows bar-type lights 36, whether water cooled or air cooled, to be hung vertically in a growing environment and effectively moved out of the way. It simplifies the growing environment and human activities in that environment.

The light trolley system 10 of the present invention allows a user to hang bar lights 36 in a vertical fashion. This apparatus will allow not only vertical light orientation, but also allow the bar lights 36 to be moved effectively out of the way of greenhouse workers, doing something that no other lighting suspension system allows. In vertical farming markets, as well as high-intensity inter-lighting scenarios, this orientation and setup can be extremely useful to producers, especially as they adopt vertical plane production techniques.

The light trolley system 10 of the present invention is designed to hold two rows of growing towers 12, i.e., the growing plane. The growing towers 12 are placed in the middle of the light trolley system 10 or placed on either side of the light trolley system 10 to take advantage of the double sided lights. The light trolleys 14 can move perpendicular to the growing plane (FIG. 1) and parallel and horizontally with the growing plane (FIG. 12). Typically, the light trolley system 10 for parallel movement of lights, the light trolley system 10 is larger since for the parallel configuration, the lights stay more out of the way on a larger light trolley system 10 that covers multiple growing towers a row.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein may be suitably practiced in the absence of the specific elements which are disclosed herein.

The invention claimed is:

1. A light trolley system comprising:
a support structure, the support structure comprising a plurality of vertical members and a plurality of horizontal members, wherein the plurality of horizontal members are supported by the plurality of vertical members;
a pair of C rails suspended from and secured to a pair of opposing horizontal members of the support structure;
a light trolley secured to a set of connection mechanisms, wherein a first connection mechanism of the set of connection mechanisms is configured to slide within a first C rail of the pair of C rails and a second connection mechanism of the set of connection mechanisms is configured to slide within a second C rail of the pair of C rails, wherein the light trolley is slidable between a first end region of each C rail of the pair of C rails and a second end region of each C rail of the pair of C rails, the light trolley further comprising a brace structure and a light manifold, wherein the brace structure is mounted to the set of connection mechanisms that are configured to slide within the pair of C rails, wherein the light manifold is mounted to the brace structures; and
a plurality of bar lights mounted to the light manifold.

2. The light trolley system of claim 1 the support structure further comprising a plurality of removable support sections, the plurality of removable support sections configured to provide support structure sizing flexibility.

3. The light trolley system of claim 1, wherein the plurality of horizontal members comprising the support structure are configured in a quadrilateral polygonal shape, and wherein each vertical member of the plurality of vertical members is interposed between a vertex of the quadrilateral polygonal shape and the ground.

4. The light trolley system of claim 1 and further comprising a second light trolley, the second light trolley comprising:
a second brace structure mounted to a second set of connection mechanisms configured to slide within the first C rail and the second C rail of the pair of C rails; and
a second light manifold secured to the second brace structure, wherein a second plurality of bar lights is mounted to the second light manifold.

5. The light trolley system of claim 4 and further comprising:
at least one blocking stopper mounted to the first C rail and the second C rail, the at least one blocking stopper preventing the light trolley from contacting the second light trolley.

6. The light trolley system of claim 1 wherein the brace structure is configured as a quadrilateral polygon.

7. The light trolley system of claim 1, the brace structure further comprising:
a first brace member, wherein the first brace member is mounted to the first connection mechanism of the set of connection mechanisms, wherein the first connection mechanism is configured to slide within the first C rail of the pair of C rails, wherein the first brace member is mounted to the second connection mechanism of the set of connection mechanisms, and wherein the second connection mechanism is configured to slide within the second C rail of the pair of C rails; and
a second brace member rigidly coupled to the first brace member, wherein the second brace member is mounted to a third connection mechanism of the set of connection mechanisms, wherein the third connection mechanism is configured to slide within the first C rail of the pair of C rails, wherein the second brace member is mounted to a fourth connection mechanism of the set of connection mechanisms, and wherein the fourth connection mechanism is configured to slide within the second C rail of the pair of C rails.

8. The light trolley system of claim 1 and further comprising:
at least one stopper mounted to the first C rail and the second C rail, the at least one stopper limiting travel of the light trolley.

9. The light trolley system of claim 1, wherein each bar light of the plurality of bar lights is comprised of a water cooled bar light, wherein the light manifold is constructed of rigid tubing allowing coolant to flow through each of the plurality of bar lights, the light manifold having an intake port and output port, and wherein the intake port and the output port are coupled to a coolant system via flexible tubing configured to allow the light trolley to remain coupled to the coolant system as the light trolley slides along the pair of C rails.

10. The light trolley system of claim 9 and further comprising:
at least one hanging adjustable pipe clamp for securing the light manifold to the brace structure.

11. The light trolley system of claim 1 wherein the brace structure is connected to a platform for supporting the light trolley.

12. The light trolley system of claim 1 wherein power supplies are mounted directly to the brace structure.

13. The light trolley system of claim 1 and further comprising:
a set of C rail brackets, wherein the pair of C rails are secured to the pair of opposing horizontal members of the support structure via the set of C rail brackets.

* * * * *